United States Patent [19]

DeMario et al.

[11] Patent Number: 4,839,136
[45] Date of Patent: Jun. 13, 1989

[54] SPACER FOR NUCLEAR FUEL RODS

[75] Inventors: Edmund E. DeMario, Columbia, S.C.; Anders Johansson; Olov Nylund, both of Västeras, Sweden

[73] Assignee: AB Asea-Atom, Västeras, Sweden

[21] Appl. No.: 109,832

[22] Filed: Oct. 16, 1987

[30] Foreign Application Priority Data

Oct. 23, 1986 [SE] Sweden .............................. 8604531
Oct. 23, 1986 [SE] Sweden .............................. 8604530
Oct. 23, 1986 [SE] Sweden .............................. 8604529

[51] Int. Cl.$^4$ ............................................. G21C 3/34
[52] U.S. Cl. .................................. 376/462; 376/438; 376/441
[58] Field of Search ................ 376/438, 441, 442, 462

[56] References Cited

U.S. PATENT DOCUMENTS

| | | | |
|---|---|---|---|
| 3,536,583 | 10/1970 | Sahlin et al. | 376/442 |
| 3,629,067 | 12/1971 | Demaison et al. | 376/442 |
| 3,764,471 | 10/1973 | Ripley | 376/442 |
| 4,077,843 | 3/1978 | Patterson et al. | 376/442 |
| 4,325,786 | 4/1982 | Wohlsen | 376/442 |
| 4,389,369 | 6/1983 | Bryan | 376/442 |
| 4,416,852 | 11/1983 | Nylund | 376/438 |
| 4,544,522 | 10/1985 | Curulla et al. | 376/442 |
| 4,695,426 | 9/1987 | Nylund | 376/441 |
| 4,740,350 | 4/1988 | Taleyarkhan | 376/441 |

FOREIGN PATENT DOCUMENTS 1514559  6/1969  Fed. Rep. of Germany ...... 376/441

Primary Examiner—Deborah L. Kyle
Assistant Examiner—Daniel Wasil
Attorney, Agent, or Firm—Watson, Cole, Grindle & Watson

[57] ABSTRACT

A bimetallic spacer for supporting fuel rods in position in a nuclear reactor fuel assembly substantially comprises inner and outer structural elements of a first metallic material and spring elements of a second metallic material. The structural and spring elements together define a lattice, the interstices of which receive the individual fuel rods. The structural elements and spring elements in the spacer are connected together by forming the structural elements with openings and fitting the ends of the spring elements in the openings. At one end of the opening in the structural element, two slots can be provided for forming a tongue-shaped member which is moved aside to make space for the spring element and then moves back when the end of the spring element is in position, thus preventing a possible vertical return movement of the end of the spring element.

10 Claims, 4 Drawing Sheets

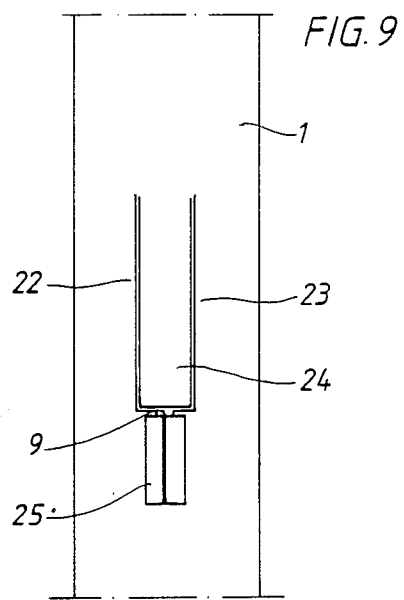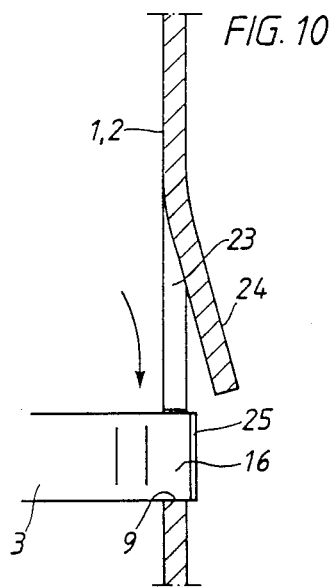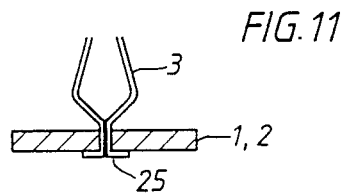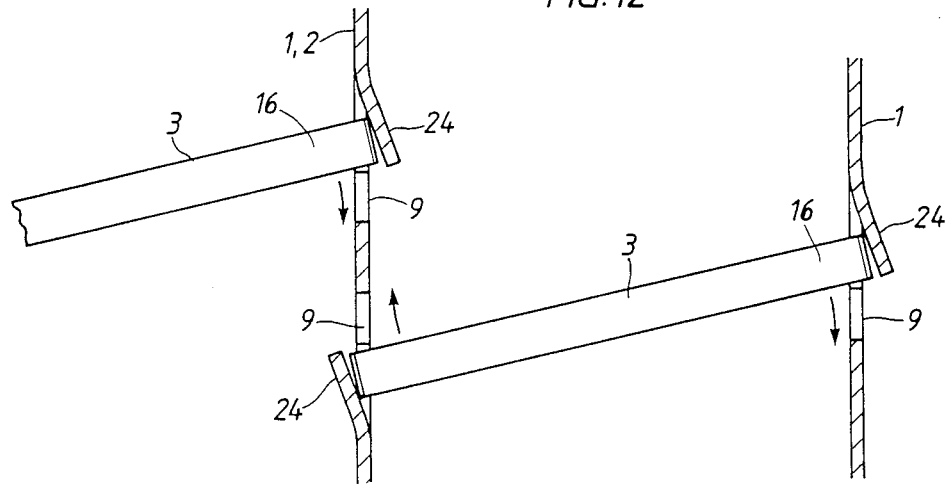

SPACER FOR NUCLEAR FUEL RODS

TECHNICAL FIELD

The present invention relates to a bimetallic-type spacer for locating fuel rods in position in a nuclear reactor fuel assembly, the spacer having structural elements and spring elements.

BACKGROUND ART

A variety of different embodiments of spacers for locating (i.e., supporting and fixing) fuel rods in position in a nuclear reactor fuel assembly are already known. Fuel rod-locating spacers which are made completely of a zirconium alloy exhibit good mechanical strength while providing a small neutron capture cross-section. To counteract vibration and hence mechanical wear, it is known to provide spring elements as component parts of the structural element of the spacer. However, the resilience of a zirconium alloy is adversely affected by intense nuclear radiation, so that the spring force is reduced over extended exposure times. This deterioration in resilient properties of the spring element is known as "relaxation".

In bimetallic spacers, for example as described in U.S. Pat. Nos. 3,664,924 and 3,674,635, the structural elements are made wholly of a zirconium alloy while the spring elements are constructed of a nickel-based alloy. Each spacer should have a low flow resistance with respect to the coolant which flows through the fuel assembly in the axial direction of the fuel rods. The spring elements should have good resilient properties to ensure secure fixing of the fuel rods. Further, the spacer with its structural elements and spring elements should have little influence on the neutron flux density in the fuel assembly. It may be difficult to find materials and combinations of materials which in a spacer construction provide a low coolant flow resistant, little influence on the neutron flux density while at the same time having good resilient properties. Structural elements made from a zirconium alloy have good mechanical strength and a small neutron capture cross-section and therefore exert little influence on the neutron flux density, but normally they cannot be made sufficiently thin to provide the desirable low coolant flow resistance. Spring elements made from a nickel-based alloy, for example Inconel, have good mechanical strength and, because of their thinness, they do not significantly increase the coolant flow resistance, but because of their relatively large neutron capture cross-section, they do influence the neutron flux density in the spacer. Differences in the irradiation growth of the structural elements and the spring elements must also be taken into consideration.

SUMMARY OF THE INVENTION

In order to provide a low coolant pressure drop across a bimetallic spacer having outer and inner structure elements providing good mechanical stability and spring elements defining a reactor lattice, the inner structural elements are arranged crosswise or displaced crosswise in relation to each other, forming a cruciform configuration (to provide spaces for four fuel rods) or a cruciform configuration with a displaced cruciform center (to provide spaces for six fuel rods). The regions limited by the outer structural elements and the inner structural elements provide a substantially quadrilateral (e.g. square or rectangular) cross-section with room for four or six fuel rods fixed in position and separated by the spring elements. From a consideration of the properties of the materials used, if the structural elements are made of a zirconium alloy, a relatively thick sheet material (e.g., about 0.7 mm. thick) will be required, whereas if the spring elements are made of a nickel-based alloy, they can be made of relatively thin sheet material (e.g., of about 0.2 mm. thickness). With a bimetallic spacer made with zirconium alloy and nickel-based alloy according to the above, a small internal resistance to coolant flow is provided in comparison with the condition prevailing in a conventional spacer of bimetallic type. This improvement arises due to the fact that a smaller part of the inner structure is occupied by the inner structural elements which have to be made of the thicker sheet material.

To simplify the construction of the spacer but still ensure good functional performance, the structural elements are desirably formed with openings into which ends of the spring elements can locate. Preferably, at one end of each opening in a structural element, two spaced-apart slots are provided which define therebetween a tongue-shaped member. When a spring element is to be fixed in position in a structural element, the tongue-shaped member can be moved to provide space for the insertion of the spring element into the opening in the structural element, the tongue-shaped member then being returned to its normal position to prevent a removal of the end of the spring element from the opening.

This type of fixing ensures a reliable attachment of the spring elements in the structural elements even if the spring elements become heavily deformed when inserting a fuel rod in the spacer. Such deformation can be caused by the end of a fuel rod failing to locate in an interstice of the lattice formed by the spacer and thus knocking against the spring element. Another advantage of the tongue-type fixing is that the structural elements and the spring elements can be completely assembled separately before they are connected together.

BRIEF DESCRIPTION OF THE DRAWINGS

The invention will now be further described, by way of example, with reference to the accompanying drawings, in which:

FIGS. 9 and 10 show, on an enlarged scale, one arrangement for the connection of a spring element to the structural element of the spacer of FIGS. 1 and 2 or FIGS. 5 and 6, FIG. 11 is a detail showing how the bent-out end parts of a spring element can be arranged to make contact with the outer surface of the structural element of a spacer according to the invention, FIG. 12 shows how several tongue-shaped members can be used to secure two spring elements at different levels in the structural elements.

DESCRIPTION OF THE PREFERRED EMBODIMENTS

Figure 1:
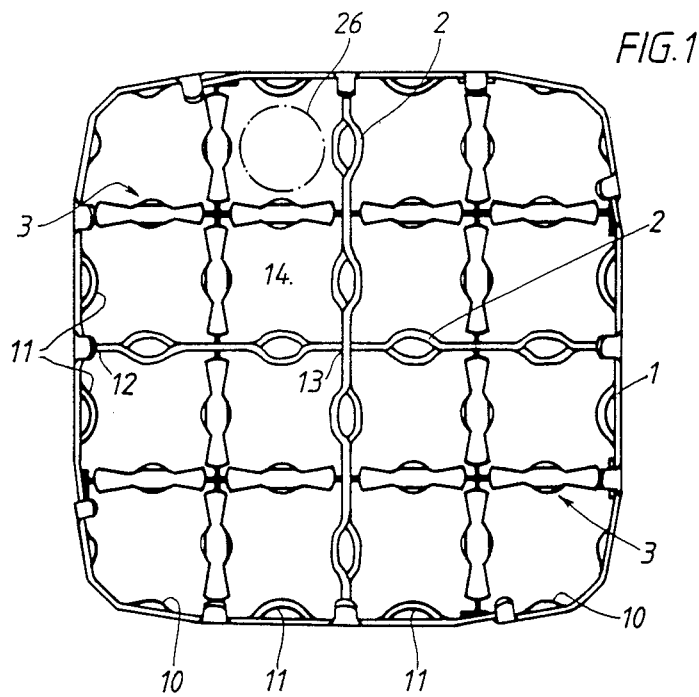
FIGS. 1 and 2 show a view from above and from the side, respectively, of a bimetallic spacer in accordance with the invention exhibiting a 4×4 lattice.

A bimetallic spacer as used in a nuclear reactor substantially consists of structural elements of a zirconium alloy and spring elements of a nickel-based alloy. The structural elements 1, 2, which constitute the fixed structure, may, for example, be made from the zirconium-based alloys, known under the trade names Zircaloy 2 or Zircaloy 4, whose contents of alloying materials lie within the ranges 1.2-1.7% for tin, 0.07-0.24% for iron, 0.05-0.15% for chromium, 0.00-0.08% for nickel, 0.09-0.24% for oxygen, the balance being zirconium, and impurities normally occurring in reactor grade zirconium. Zircaloy 2 contains 1.2-1.7% tin, 0.07-0.20% iron, 0.05-0.5% chromium, 0.03-0.08% nickel and 0.09-0.16% oxygen, Zircaloy 4 contains 1.2-1.7% tin, 0.18-0.24% iron, 0.07-0.13% chromium, and 0.09-0.16% oxygen. All the percentages given here relate to percentage by weight. The spring elements 3, which constitute the resilient and fixing part of the spacer, may, for example, be made of Inconel, a nickel-based alloy comprising 77% nickel, 15% chromium, and 7% iron. The bimetallic spacer forms with its structural elements 1, 2 a fixed structure, to which the spring elements 3 are fixedly connected. A spacer according to the invention, with its structural elements 1, 2 and its spring elements 3, may define a lattice, for a 4×4 or a 5×5 array of fuel rods. The outer structural elements 1 form an essential square frame to which there are connected the inner structural elements 2 arranged crosswise, or to which there are connected inner structural elements with a displaced cruciform center. In each subspace there are inserted fixedly connected spring elements 3. This enables the structural elements and the spring elements to jointly form a grid having space for holding together and fixing in position sixteen or twenty-five fuel rods in a fuel assembly, each fuel rod then being surrounded by both structural elements and spring elements.

Figure 2:
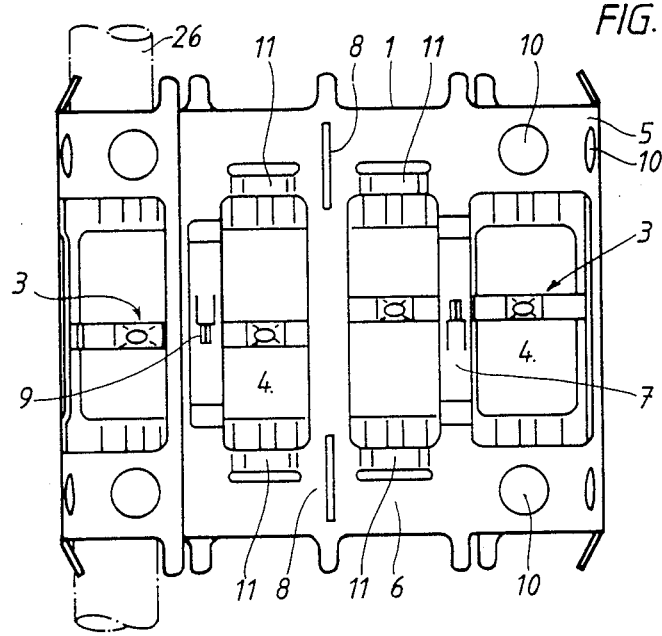

FIGS. 1 and 2 show more closely how a bimetallic spacer for locating fuel rods in position in a nuclear reactor fuel assembly is constructed from outer and inner structural elements 1, 2 and spring elements 3 arranged to together form a 4×4 lattice, one fuel rod being located in each interstice of the lattice. To reduce the pressure drop across the spacer, the inner structural elements 2 are arranged so that as small a part as possible of the cross-section available to coolant flow is blocked by these elements. The structural elements 1, 2 have been punched out of a strip-formed sheet of a zirconium alloy material, which for reasons of material strength should be relatively thick (e.g. about 0.7 mm.). The strip-formed sheet material is first provided with openings 4, for example by punching, thus forming parallel, longitudinal upper and lower strips 5, 6 with intermediate pieces 7 located between the openings 4. Thereafter, the strip material is further provided with transverse slots 8 in the strips 5, 6, with recesses 9 in the intermediate pieces 7, and with projections 10 and counter supports 11 in the strips 5, 6. The slots 8 are provided for connecting together the inner and outer structural elements 1, 2. The recesses 9 are provided for the attachment of the spring elements 3. The projections 10 and the counter supports 11 are arranged so as to be able, together with the spring elements 3, to fix the position of the inserted fuel rods in the spacer. Two fuel rods are shown schematically by chain lines 26 in FIGS. 1 and 2. The outer structural elements 1 have been formed by cutting the longitudinal strips 5, 6, connected to the intermediate pieces 7, folding them and connecting them to two essentially square frames joined to the intermediate pieces 7. The inner structural elements 2 have been formed by cutting longitudinal strips 5, 6, connected to intermediate pieces 7, into appropriate lengths and then connecting them crosswise. One end 12 of a first inner structural element is connected perpendicularly to a first side of the outer structural element. At the center 13, the first inner structural element is joined to the second inner structural element in a cruciform configuration. In this way the outer and inner structural elements 1, 2 together form four defined, uniform outer sub-regions 14, each having an essentially square cross-section. The composite inner structural elements 2 with their free ends are connected to the outer structural elements 1 in the slots 8.

Figure 3:
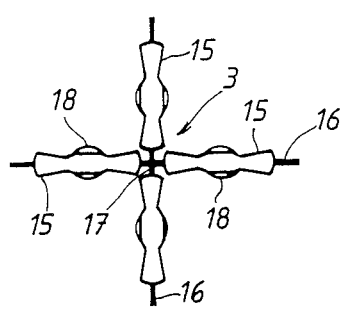
FIGS. 3 and 4 show one of the spring elements from the spacer of FIGS. 1 and 2 also from above and from the side, respectively.
Figure 4:
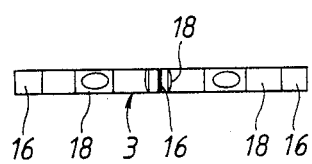

The spring elements 3 shown in FIGS. 3 and 4, are desirably made from a nickel-based alloy, for example Inconel. They can be made of relatively thin sheet metal, about 0.2 mm. thick, having good mechanical strength and a low flow resistance. The spring elements 3 substantially consist of pairs of folded strips 15 of springy material which are in contact at their outer ends 16 and in the center 17 but diverge from one another over regions 18 between the ends 16 and center 17. In each region 18 the strips 15 have been given a convex shape to resiliently press against the fuel rod subsequently inserted into the respective interstice defined by the spacer. The springy strips 15 which are joined together in pairs are connected together to form a cruciform spring element 3. With this construction of spring elements it will be possible, in sub-regions of the spacer, together with the inner and outer structural elements, to support in correct juxtaposition and fix in position, four fuel rods. The spring elements 3 are connected, with their free ends 16, to the inner structural elements 2 and to the outer structural elements 1 in the recesses 9.

During transportation of fuel rods, for example, the spring elements 3 may be subjected to a shock load, which could lead to a plastic deformation of the springy strips 15. To counteract mechanical stress caused by, for example, such a shock load, the springy strips 15 are separated from each other in each region 18 by a largest distance which only permits the springy strips 15, under external mechanical influence, to be elastically deformed within the region of elastic deformation, before one springy strip contacts the other springy strip in the divergent region 18. In this way, each springy strip 15 can only be deformed within the limits of its elastic range, which means that no permanent deformation (plastic deformation) of either strip 15 will occur. In each cell or interstice of the lattice, a fuel rod in the upper as well as the lower part of the structural elements will rest against at least two projections 10 or counter supports 11, and in the mid-portion it will rest against at least two spring elements.

With the type of spacer described above it is possible to hold together and fix in position sixteen fuel rods and to obtain a low pressure drop for coolant flowing around the rods without significantly deteriorating the mechanical strength of the spacer. In relative terms, the inner flow resistance has been reduced by the use of the cruciform spring elements arranged in pairs, and by the structural elements blocking as small a part of the cross-section available for coolant flow as possible.

In the different sub-spaces 14, the cruciform-shaped spring elements 3 are offset with respect to each other, i.e., positioned at different axial locations within the outer structural element to enable simple fixture in the structural elements 1, 2. The spring elements 3 can, as discussed above, be manufactured of long, profiled springy strips, which have been assembled and connected pairwise. To form the cruciform configuration, two springy strips have also been connected to a pair of transverse springy strips. This enables the springy strips jointly to form a cruciform configuration, each central region consisting of springy strips, interconnected in pairs which together form a common cruciform center.

Figure 5:
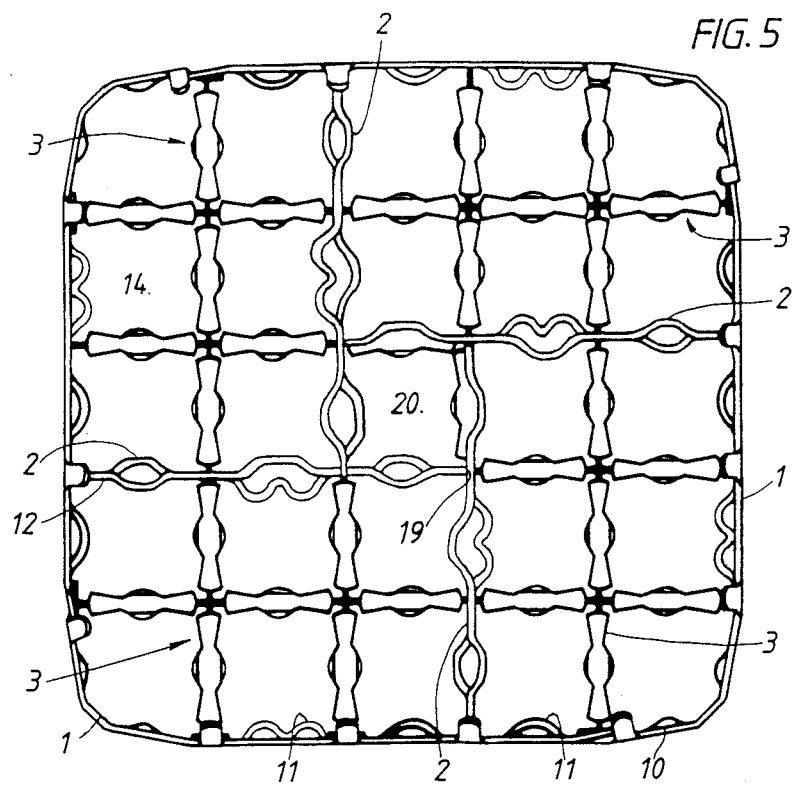
FIGS. 5 and 6 show a view from above and from the side, respectively, of a second embodiment of bimetallic spacer in accordance with the invention exhibiting a 5×5 lattice.
Figure 6:
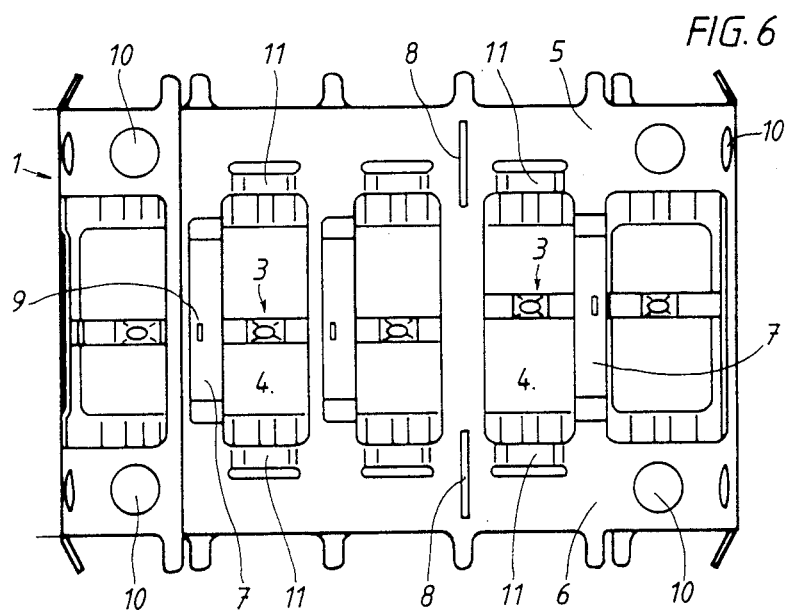

FIGS. 5 and 6 show in more detail how a similar bimetallic spacer is constructed from outer and inner structural elements 1, 2 and spring elements 3 to provide a 5×5 lattice. The inner structural elements 2 have here been formed by cutting longitudinal bands, connected to intermediate pieces, into appropriate lengths and then interconnecting them crosswise to form a displaced cruciform center. The end 19 of the inner structural element 2 is connected perpendicularly to a second inner structural element, which in itself is perpendicularly connected to an adjacent second side of the outer structural element, where the point of connection 19 lies at a distance of approximately one fuel rod diameter from the inner end of the second inner structural element. In this way, the outer and inner structural elements 1, 2 together form four defined outer sub-regions 14 each having an essentially rectangular cross-section and a smaller, defined inner square sub-region 20 which constitutes the open cruciform center providing space for, for example, a further fuel rod. The composite inner structural elements 2 are connected, at their free ends, to the outer structural elements 1 in the slots 8.

Figure 7:
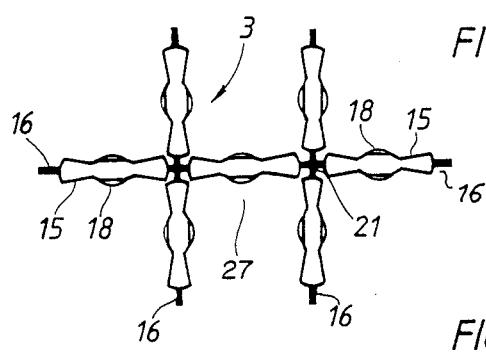
FIGS. 7 and 8 show one of the assopciated spring elements from the spacer of FIGS. 5 and 6 also from above and from the side, respectively.
Figure 8:
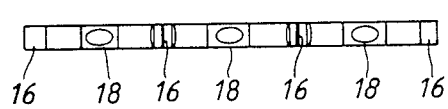

The spring elements required for the spacer of FIGS. 5 and 6 are shown in FIGS. 7 and 8 and substantially consist of springy strips 15, interconnected in pairs, which have been connected together in contact at their ends 16 and 21 but which diverge over regions 18 where the springy strips 15 have been given convex shapes to resiliently press against the fuel rods subsequently inserted into the spacer. Single springy strips are inserted into the inner square sub-region 20 in order to press in a resilient manner against a single fuel rod or water rod which might be located there. The springy strips 15 which are interconnected in pairs are further assembled together to form two composite cruciform spring elements 3 with a common spider connection 27. With this design of the spring elements 3 it is possible for the spring elements 3, in each outer rectangular sub-region of the spacer together with the inner and outer structural elements 1 and 2, to hold together and fix in position six fuel rods. The spring elements 3 are connected, with their free ends, to the inner and outer structural elements 1, 2.

Possibly, additional overlying and underlying structural elements can be arranged above and below the inner spring elements, which are arranged in pairs, towards a corner of the enlarged cruciform center.

With the type of spacer shown in FIGS. 5 and 6 it is possible to hold and fix in position twenty-five fuel rods and to cause a low pressure drop without significantly deteriorating the mechanical strength of the spacer. To form the double cruciform configuration, the springy strips have been provided with two transverse short springy strips. This enables the spring elements jointly to form the pairwise cruciform configuration with the common spider 22.

A bimetallic spacer according to FIGS. 1 and 2 or 5 and 6 with its structural elements form a fixed structure, to which the spring elements, which may be arranged as a spring package, are fixedly connected.

The outer structural element forms an essentially square frame, to which the inner structural elements are connected. Into each sub-space defined by the connected inner and outer structural elements there is inserted the appropriate spring element. The structural elements and the spring elements then together form a grid for holding and fixing the fuel rods in position in a fuel assembly, each fuel rod then being surrounded by both structural elements and spring elements.

FIGS. 9 to 12 show in more detail part of an intermediate piece of a structural element 1, 2. A thin rectangular recess 9 is provided in the intermediate piece, for example by punching, for receiving the end 16 of a spring element 3. Two parallel spaced-apart slots 22, 23 are provided in the structural element 1, 2 close to the recess 9. That part of the structural element 1, 2 which is located between the slots 22, 23 forms a tongue-shaped member 24 which is directed towards the recess 9, the free end of which tongue-shaped member may be moved out from the recess 9 of the structural element 1, 2. When the end 16 of the spring element 3 is to be moved into the recess 9, the end 16 will first be moved along the structural element 1, 2 between the slots 22, 23, whereby the end 16 will move along the tongue-shaped member 24. This movement then continues until the end 16 is fully located into the recess 9 in the structural element 1, 2. When the end 16 is in position, the tongue-shaped member 24 is moved back to fix the spring element 3. The member 24 may spring or snap back of its own volition—if it has inherent resiliency and has been forced outwardly as the end 16 moved along the tongue-shaped member 24, but it is not ruled out that the member 24 has to be physically deformed to bring it back into a position to lock the end 16 in place in the recess 9. Possibly after the end 16 of the spring element 3 has been placed in its correct position, the member 24 may be fixed in its original position (e.g., by means of a welded joint or the like bridging either or both of the slots 22, 23) to ensure the retaining of the spring element 3 in the structural element 1, 2. After proper insertion in the recess 9, the end 16 of the spring element 3 may be deformed so as to project outside the structural element 1, 2. Since the spring element 3 is normally composed of two springy strips, the ends of the strips, even before inserting the spring element 3 into the recess 9, may be separated and bent out (as at 25) in order to obtain an even more reliable connection between the spring element 3 and the structural element 1, 2 after the region between the outer point of connection of the springy strips and the bent-out and separated ends of the springy strips have been moved into the slot/the narrow recess 9. When inserting a spring element 3 between two structural elements 1, 2, as shown in FIG. 12, the tongue-shaped members 24, arranged in the vicinity of each recess 9, may be directed in opposite directions to facilitate the insertion of the opposite ends of the spring elements 3 into the respective recesses 9.

Figure 13:
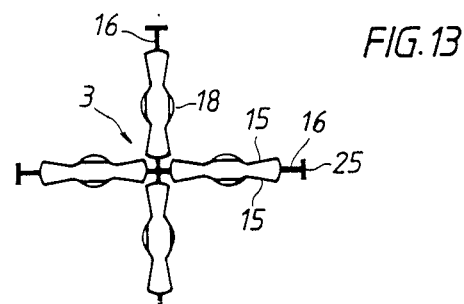
FIGS. 13 and 14 show from above and from the side, respectively, one of the spring elements shown in FIG. 12.
Figure 14:
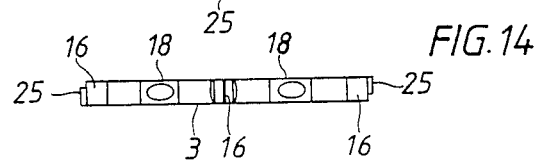

FIGS. 13 and 14 show an example of a spring element 3 which is composed in a single crosswise manner, the free ends 16 of the element being provided with bent-out portions 25.

The invention is not to be seen as being limited to the particular constructions shown in the accompanying drawings since many modifications can be made to the illustrated arrangements without departing from the scope of the invention as defined in the following claims.

What is claimed is:

1. A bimetallic spacer for supporting a plurality of fuel rods and fixing said fuel rods in position in a nuclear reactor fuel assembly, said bimetallic spacer comprising
   an elongated outer structural element which provides four sides and defines an interior space therein,
   a plurality of interconnected inner structural elements which are connected to said outer structural element and which extend into said interior space to divide said interior space into a plurality of subspaces, and
   a plurality of spring elements which are each connected to two sides of said outer structural element and to two of said plurality of inner structural elements so as to extend across an associated subspace, each spring element having a double cruciform shape and, together with the sides of the outer and inner structural elements to which it is attached, providing six interstices through which six fuel rods can be extended.

2. A spacer according to claim 1, wherein each of the four sides of said outer structural element provide projections which extend into the interstices adjacent thereto.

3. A spacer according to claim 1, wherein each spring element is constructed of folded strips of springy material, a set of three strips defining parts of interstices for two fuel rods at each end of the spring element and a common spider connected between said sets of three strips, which in part defines interstices for two additional fuel rods.

4. A spacer according to claim 5, wherein three pairs of folded strips of springy material define three legs of each spring element, two of said legs having the constituent strips in contact at each end and in the center but diverging from one another over a region between each end and the center, the degree of divergence being insufficient to allow either strip to exceed its elastic deformation limit if the two separated strip parts over each said region are pressed together, the third leg being like one of the other two legs but having a third divergent region formed centrally therein.

5. A spacer according to claim 3, wherein the folded strips of springy material are connected to the inner and outer structural elements at different axial locations within the outer structural element.

6. A spacer according to claim 4, wherein the folded strips of springy material are connected to the inner and outer structural elements at different axial locations within the outer structural element.

7. A spacer according to claim 1, wherein the outer and inner structural elements are formed of a sheet material which has been provided with openings separated by intermediate pieces, defining two essentially parallel upper and lower bands in which inwardly-extending, spaced-apart projections are provided, the outer structural element being formed by folding the sheet material and connecting the ends thereof to form said outer frame-shaped structural element having an essentially square cross-section into which said projections extend.

8. A spacer according to claim 1, wherein the inner and outer structural elements are made of a zirconium alloy and the spring elements are made of a nickel-based alloy.

9. A spacer according to claim 1, wherein the inner and outer structural elements each includes a recess and a spaced-apart slot in immediate proximity to an associated recess for defining a tongue-shaped member whose free end is directed towards the associated recess, each said tongue-shaped member having at least the same width as the associated recess, and wherein the respective ends of said spring elements can be guided along respective tongue-shaped members and into the associated recesses for attachment to the respective inner or outer structural elements.

10. A spacer according to claim 3, wherein the ends of the strips of springy material which are located in the recesses in the outer structural element are bent outwardly to lie on an outer side of the outer structural element at the location of the respective recess.

* * * * *